(12) United States Patent
Kitaori et al.

(10) Patent No.: US 6,702,088 B2
(45) Date of Patent: Mar. 9, 2004

(54) WET FRICTION PLATE

(75) Inventors: Ken Kitaori, Wako (JP); Shigeru Tajima, Wako (JP); Kimikazu Ohtsuki, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/141,885

(22) Filed: May 10, 2002

(65) Prior Publication Data
US 2003/0010596 A1 Jan. 16, 2003

(30) Foreign Application Priority Data

May 15, 2001 (JP) ........................................ 2001-145464

(51) Int. Cl.$^7$ .............................................. F16D 13/74
(52) U.S. Cl. ............................... 192/113.36; 192/70.14; 192/70.12
(58) Field of Search .................... 192/70.12, 70.14, 192/113.36

(56) References Cited

U.S. PATENT DOCUMENTS

| | | | | |
|---|---|---|---|---|
| 3,249,189 A | * | 5/1966 | Schjolin et al. | 192/70.12 |
| 3,476,228 A | * | 11/1969 | Pritchard | 192/107 R |
| 4,995,500 A | * | 2/1991 | Payvar | 192/113.36 |
| 5,101,953 A | * | 4/1992 | Payvar | 192/113.36 |
| 5,460,255 A | * | 10/1995 | Quigley | 192/113.36 |
| 5,682,971 A | * | 11/1997 | Takakura et al. | 192/113.36 |
| 6,293,382 B1 | * | 9/2001 | Nishide et al. | 192/113.36 |

FOREIGN PATENT DOCUMENTS

JP         4-194422         7/1992

* cited by examiner

*Primary Examiner*—Rodney H. Bonck
*Assistant Examiner*—Eric M. Williams
(74) *Attorney, Agent, or Firm*—Armstrong, Kratz, Quintos, Hanson & Brooks, LLP

(57) ABSTRACT

A wet friction plate of a hydraulic clutch or hydraulic brake for an automatic transmission having a reduced friction resistance in a non-engaged state. A plurality of friction materials disposed in an annular shape with a plurality of radial oil passages each provided between the adjacent friction materials are mounted at two radially inner and outer stages on a surface of a friction plate of a wet hydraulic clutch of an automatic transmission. The friction materials are brought into contact with an annular separator plate to transmit a torque. Inner peripheral edges of each of the friction materials are formed into a V-shape toward a radially outer side. Thus, when the friction plate and the separator plate are in non-engaged states, a lubricating oil remaining between both the plates can be guided effectively to the radial oil passages by a centrifugal force and discharged to the outside, and a friction resistance due to the dragging of the lubricating oil can be reduced to avoid the generation of an energy loss.

4 Claims, 13 Drawing Sheets

WET FRICTION PLATE

BACKGROUND OF THE INVENTION

1. Field of the Invention

The present invention relates to a wet friction plate comprising a plurality of friction materials disposed circumferentially on a surface of an annular first plate with a plurality of radial oil passages each provided between the adjacent friction materials and extending radially, the friction materials being in contact with a surface of an annular second plate to transmit torque.

2. Description of the Related Art

A conventional shifting clutch of an automatic transmission employs a wet hydraulic clutch. The wet hydraulic clutch comprises a plurality of friction plates and a plurality of separator plates, which are superposed alternately on one another, and brought into pressure contact with one another by hydraulic pressure, to thereby transmit torque. For absorbing a frictional heat generated when the hydraulic clutch is shifted from the non-engaged state to the engaged state and preventing wear of the friction materials, lubricating oil is supplied to contact surfaces of the friction plates and the separator plates.

In order to enhance the responsiveness of the hydraulic clutch, the distance between the friction plates and the separator plates is set to be small. Also, in order to ensure a sufficient torque-transmitting capacity in the engaged state of the hydraulic clutch, the total area occupied by oil passages on the friction plates is limited. Therefore, the following problem occurs: The lubricating oil remaining between the friction plates and the separator plates is difficult to discharge in the non-engaged state of the hydraulic clutch, and a drag torque of the lubricating oil is generated by the relative rotation of the friction plates and the separator plates.

A friction plate is known from Japanese Patent Application Laid-open No. 4-194422, in which oil reservoirs are formed in inner peripheral edges of friction materials on the friction plate to retain a lubricating oil therein, thereby preventing the lubricating oil from flowing between the friction plate and a separator plate to reduce the drag torque, and discharging, by centrifugal force, the lubricating oil accumulated in the oil reservoirs through oil passages extending radially.

The friction plate described in the above-described Japanese Patent Application Laid-open No. 4-194422 suffers from not only an increased processing or working cost, because the oil reservoir is required to be formed in the inner peripheral edges of the extremely thin friction materials, but also from shedding of the friction materials, because the lubricating oil is liable to flow from the oil reservoirs into a space between each of the friction materials and a plate supporting the friction materials.

SUMMARY OF THE INVENTION

The present invention has been accomplished with the above circumstances in view, and it is an object of the present invention to provide a further reduction in friction resistance in the non-engaged state of a hydraulic clutch or hydraulic brake of an automatic transmission.

To achieve the above object, there is provided a wet friction plate comprising a plurality of friction materials disposed circumferentially on a surface of an annular first plate with a plurality of radial oil passages each provided between adjacent ones of the friction materials and extending radially. The friction materials are in contact with a surface of an annular second plate to transmit torque. The plurality of friction materials are disposed at a plurality of radially inner and outer stages with circumferential oil passages provided between the stages and extending circumferentially along inner peripheral edges of the friction materials, and at least a portion of each of the inner peripheral edges of the friction materials is inclined radially outwards toward a radially inner end of each of the radial oil passages facing a delayed side of each friction material in a rotational direction.

With the above arrangement, at least a portion of the inner peripheral edge of each of the friction materials mounted on the surface of the annular first plate is inclined outwards toward the radially inner end of each of the radial oil passages facing a delayed side of each friction material in the rotational direction. Therefore, the lubricating oil flowing outwards by centrifugal force and flowing toward the delayed side in the rotational direction by the Coriolis force can be guided on at least a portion of each of the inner peripheral edges of the friction materials and introduced effectively to the inner ends of the radial oil passages on the delayed side in the rotational direction. Thus, the amount of the lubricating oil flowing onto the surfaces of the friction materials in the entire region of the surface of the first plate and remaining between the surfaces of the first and second plates can be reduced, to thereby prevent an increase in friction resistance due to the dragging of the lubricating oil. Also, the first and second plates can be moved uniformly away from each other by a hydraulic pressure load of the lubricating oil flowing into the radial oil passages, to thereby prevent an increase in friction resistance further effectively. Moreover, because the plurality of friction materials are disposed at the plurality of radially inner and outer stages with the circumferential oil passage provided between the inner and outer stages to extend circumferentially, a hydraulic load of the lubricating oil can be generated in both the inner radial oil passages and the outer radial oil passages, whereby the first and second plates can be moved further reliably away from each other.

In addition to the arrangement described above, there may also be provided a wet friction plate wherein the radial oil passages defined between the friction materials at the radially inner stage are offset to the delayed side in the rotational direction with respect to the radial oil passages defined between the friction materials at the radially outer stage.

With the above arrangement, the inner radial oil passages are offset to the delayed side in the rotational direction with respect to the outer radial oil passages. Therefore, the lubricating oil flowing out of the inner radial oil passages can be guided to the inclined inner peripheral edges of the outer friction materials and permitted to further smoothly flow into the outer radial oil passages located on the delayed side in the rotational direction.

In addition to the arrangement described above, there may also be provided a wet friction plate wherein the inner peripheral edges of each of the friction materials are inclined radially outwards to form a V-shape or U-shape projecting toward radially inner ends of a pair of the radial oil passages facing circumferentially opposite sides of each of said friction material.

With the above arrangement, in addition to the inner radial oil passages being offset to the delayed side in the rotational direction with respect to the outer radial oil passages, the inner peripheral edges of each of the friction materials are inclined radially outwards to form the V-shape or U-shape. Therefore, even when the first plate is rotated in either direction, the lubricating oil can be guided on the delayed side of the inner peripheral edge of each friction material inclined into the V-shape or U-shape and permitted to smoothly flow into the outer radial oil passages located on the delayed side in the rotational direction.

DETAILED DESCRIPTION OF THE PREFERRED EMBODIMENTS

The present invention will now be described by way of embodiments of the present invention shown in the accompanying drawings.

As shown in FIGS. 1 to 4, the contour of a parallel 4-axis automatic transmission T connected to a left side of an engine E is comprised of a torque converter case 11, a transmission case 12 and a case cover 13. On the torque converter case 11 and the transmission case 12, a main shaft Sm is supported via ball bearings 14 and 15; a counter shaft Sc is supported via a roller bearing 16 and a ball bearing 17; a first subsidiary shaft Ss1 is supported via ball bearings 18 and 19; and a second subsidiary shaft Ss2 is supported via a ball bearing 20 and a roller bearing 21. A crankshaft 22 of the engine E is connected to the main shaft Sm through a torque converter 23. A final drive gear 24 integral with the counter shaft Sc is meshed with a final driven gear 26 fixed to an outer periphery of a differential gear box 25, to drive left and right driven wheels WL and WR.

Figure 1:
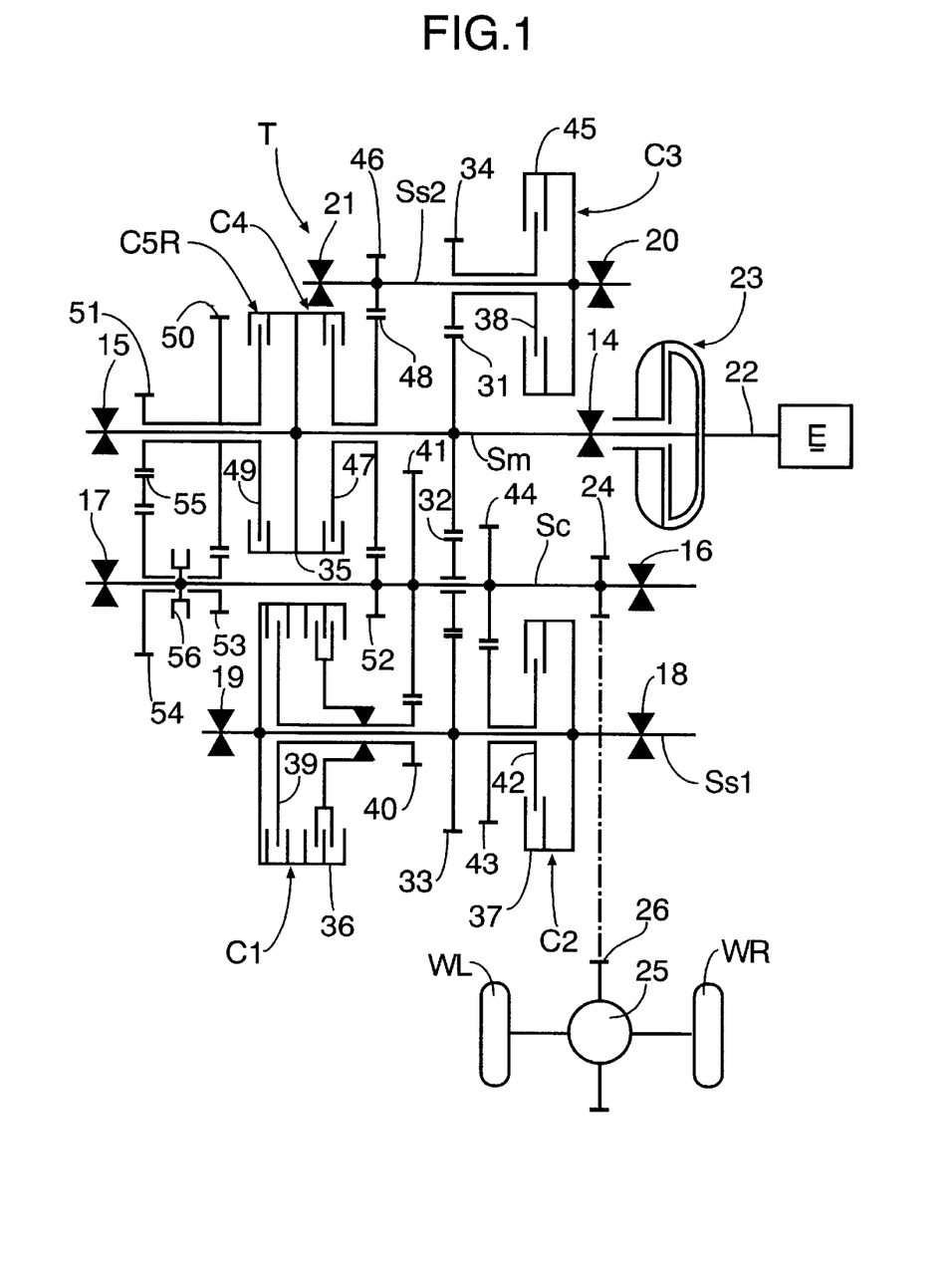
FIG. 1 is a skeleton illustration of a parallel 4-axis automatic transmission.
Figure 2:
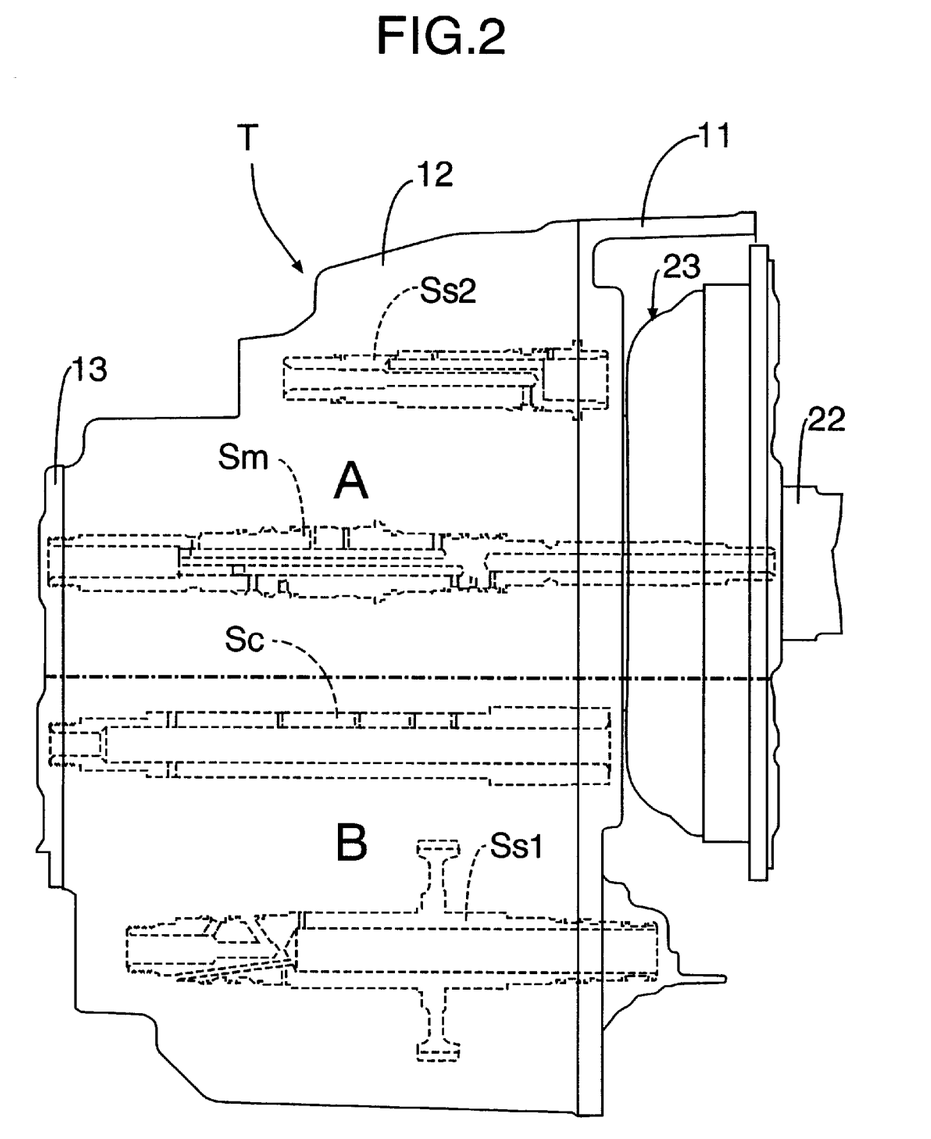
FIG. 2 is a map showing positions shown in FIGS. 3 and 4.
Figure 3:
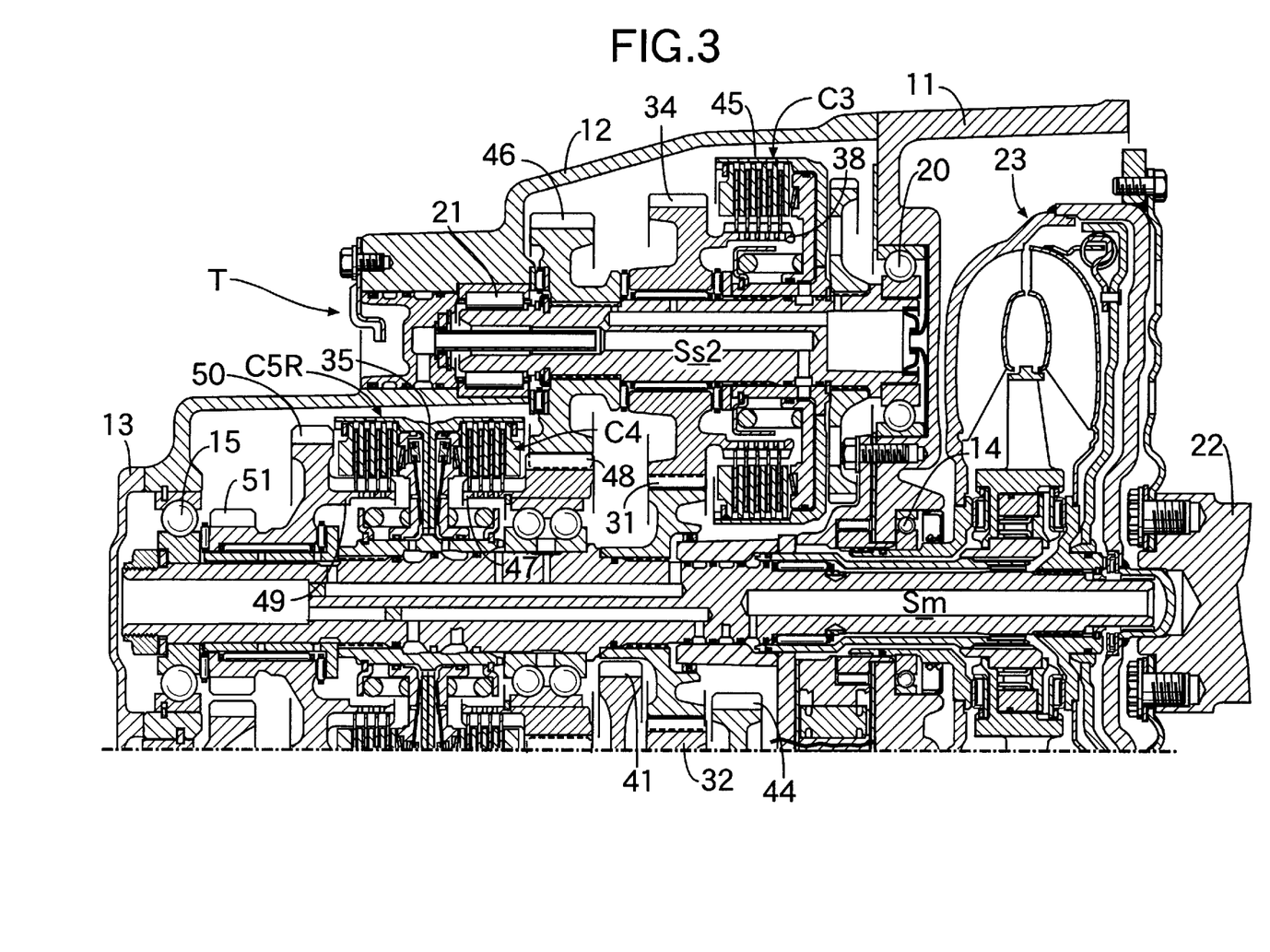
FIG. 3 is a detailed view of a section shown by A in FIG. 2.
Figure 4:
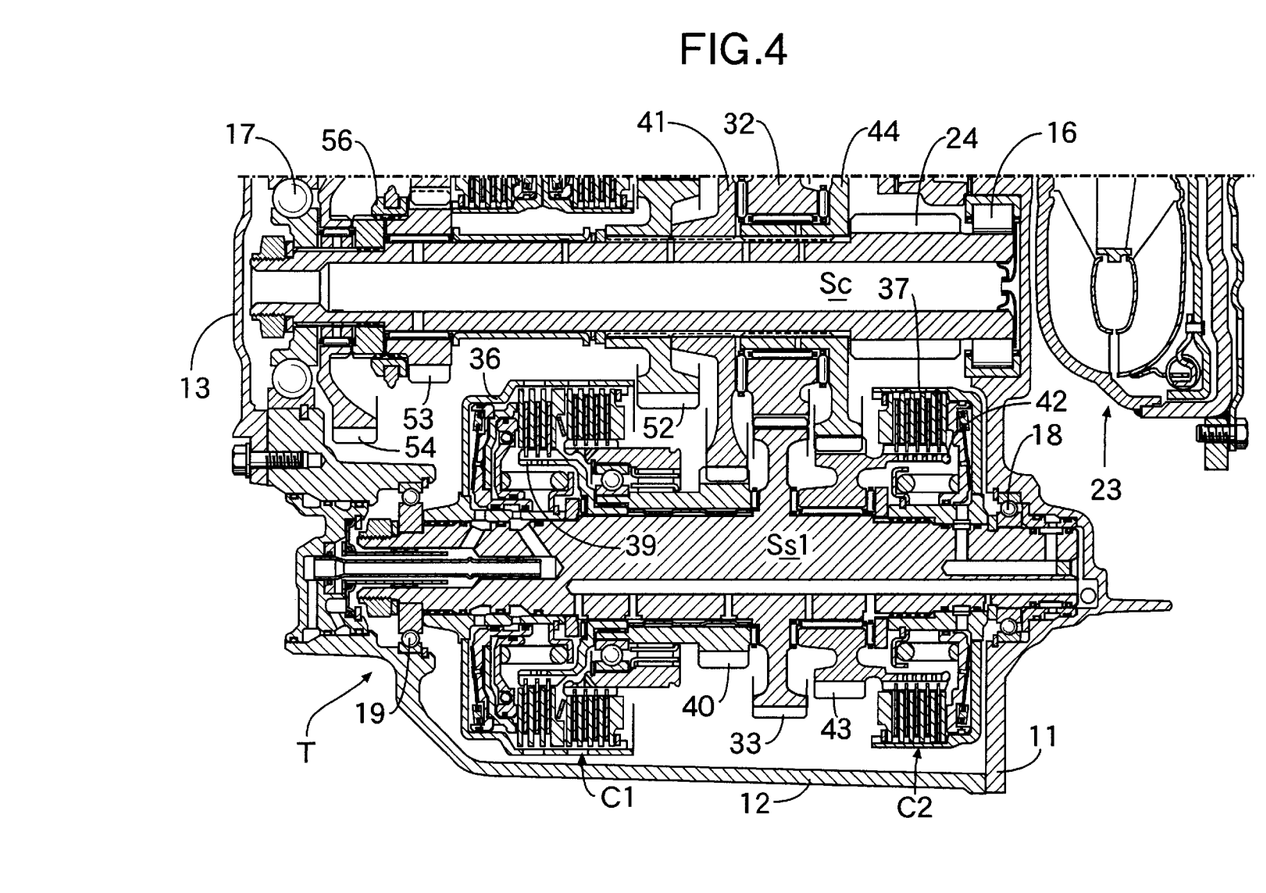
FIG. 4 is a detailed view of a section shown by B in FIG. 2.

In order to transmit the rotation of the main shaft Sm at different gear ratios to the counter shaft Sc to establish first to fifth gear shift stages and a backward gear shaft stage, a first-shift clutch C1 and a second-shift clutch C2 are mounted on the first subsidiary shaft Ss1; a third-shaft clutch C3 is mounted on the second subsidiary shaft Ss2; and a fourth-shift clutch C4 and a fifth-shift/reverse clutch C5R are mounted on the main shaft Sm. A subsidiary-shaft-driving first gear 31 integral with the main shaft Sm is meshed with a subsidiary-shaft-driving second gear 32 relatively rotatably carried on the counter shaft Sc. The subsidiary-shaft-driving second gear 32 is meshed with a subsidiary-shaft-driving third gear 33 integral with the first subsidiary shaft Ss1, and the subsidiary-shaft-driving first gear 31 is meshed with a subsidiary-shaft-driving fourth gear 34 relatively rotatably carried on the second subsidiary shaft Ss2.

Even when each of the first-shift clutch C1 to the fifth-shift/reverse clutch C5R is in a non-engaged state, the below-described members are constantly rotated in association with the rotation of the main shaft Sm. More specifically, the subsidiary-shaft-driving first gear 31 integral with the main shaft Sm and a common clutch outer 35 of the fourth-shift clutch C4 and the fifth-shift/reverse clutch C5R are constantly rotated, and the subsidiary-shaft-driving second gear 32 on the counter shaft Sc meshed with the subsidiary-shaft-driving first gear 31 on the main shaft Sm is constantly rotated. In addition, the first subsidiary shaft Ss1 integrally provided with the subsidiary-shaft-driving third gear 33 meshed with the subsidiary-shaft-driving second gear 32 is constantly rotated, and clutch outers 36 and 37 of the first-shift clutch C1 and the second-shift clutch C2 mounted on the first subsidiary shaft Ss1 are also constantly rotated. Further, the subsidiary-shaft-driving fourth gear 34 relatively rotatably carried on the second subsidiary shaft Ss2 and meshed with the subsidiary-shaft-driving first gear 31 and a clutch inner 38 of the third-shift clutch C3 integrally connected to the subsidiary-shaft-driving fourth gear 34 is also constantly rotated.

A first subsidiary first-shift gear 40 integral with a clutch inner 39 of the first-shift clutch C1 mounted on the first subsidiary shaft Ss1 is meshed with a counter first-shift gear 41 integral with the counter shaft Sc. A first subsidiary second-shift gear 43 integral with a clutch inner 42 of the second-shift clutch C2 mounted on the first subsidiary shaft Ss1 is meshed with a counter second-shift gear 44 integral with the counter shaft Sc. The second subsidiary shaft Ss2 is integrally provided with a clutch outer 45 of the third-shift clutch C3 and a second subsidiary third-shift gear 46. A main third-shift/fourth-shift gear 48 integral with a clutch inner 47 of the fourth-shift clutch C4 mounted on the main shaft Sm is meshed with the subsidiary third-shift gear 46 integral with the second subsidiary shaft Ss2. A main fifth-shift gear 50 and a main reverse gear 51 are integrally provided on a clutch inner 49 of the fifth-shift/reverse clutch C5R mounted on the main shaft Sm.

A counter third-shift/fourth-shift gear 52 integral with the counter shaft Sc is meshed with the main third-shift/fourth-shift gear 48. A counter fifth-shift gear 53 and a counter reverse gear 54 are relatively rotatably carried on the counter shaft Sc. The counter fifth-shift gear 53 is meshed with the main fifth-shift gear 50, and the counter reverse gear 54 is meshed with the main reverse gear 51 through a reverse idle gear 55 (see FIG. 1). The counter fifth-shift gear 53 and the counter reverse gear 54 on the counter shaft Sc are capable of being selectively coupled to the counter shaft Sc by a chamfer 56.

When the first-shift clutch C1 is brought into an engaged state to establish the first gear shift stage, the rotation of the main shaft Sm is transmitted to the driven wheels WL and WR through the subsidiary-shaft-driving first gear 31, the subsidiary-shaft-driving second gear 32, subsidiary-shaft-driving third gear 33, the first subsidiary shaft Ss1, the clutch outer 36 and the clutch inner 39 of the first-shift clutch C1, the first subsidiary first-shift gear 40, the counter first-shift gear 41, the counter shaft Sc, the final drive gear 24, the final driven gear 26, and the differential gear box 25.

When the second-shift clutch C2 is brought into an engaged state to establish the second gear shift stage, the rotation of the main shaft Sm is transmitted to the driven wheels WL and WR through the subsidiary-shaft-driving first gear 31, the subsidiary-shaft-driving second gear 32, the subsidiary-shaft-driving third gear 33, the first subsidiary shaft Ss1, the clutch outer 37 and the clutch inner 42 of the second-shift clutch C2, the first subsidiary second-shift gear 43, the counter second-shift gear 44, the counter shaft Sc, the final drive gear 24, the final driven gear 26, and the differential gear box 25.

When the third-shift clutch C3 is brought into an engaged state to establish the third gear shift stage, the rotation of the main shaft Sm is transmitted to the driven wheels WL and WR through the subsidiary-shaft-driving first gear 31, the subsidiary-shaft-driving fourth gear 34, the clutch inner 38 and the clutch outer 45 of the third-shift clutch C3, the second subsidiary shaft Ss2, the second subsidiary third-shift gear 46, the main third-shift/fourth-shift gear 48, the counter third-shift/fourth-shift gear 52, the counter shaft Sc, the final drive gear 24, the final driven gear 26, and the differential gear box 25.

When the fourth-shift clutch C4 is brought into an engaged state to establish the fourth gear shift stage, the rotation of the main shaft Sm is transmitted to the driven wheels WL and WR through the clutch outer 35 and the clutch inner 47 of the fourth-shift clutch C4, the main third-shift/fourth-shift gear 48, the counter third-shift/fourth-shift gear 52, the counter shaft Sc, the final drive gear 24, the final driven gear 26, and the differential gear box 25.

When the fifth-shift/reverse clutch C5R is brought into an engaged state with the counter fifth-shift gear 53 coupled to the counter shaft Sc by the chamfer 56 to establish the fifth gear shift stage, the rotation of the main shaft Sm is transmitted to the driven wheels WL and WR through the clutch outer 35 and the clutch inner 49 of the fifth-shift/reverse clutch C5R, the main fifth-shift gear 50, the counter fifth-shift gear 53, the counter shaft Sc, the final drive gear 24, the final driven gear 26, and the differential gear box 25.

When the fifth-shift/reverse clutch C5R is brought into an engaged state with the counter reverse gear 54 coupled to the counter shaft Sc by the chamfer 56 to establish the reverse gear shift stage, the rotation of the main shaft Sm is transmitted to the driven wheels WL and WR through the clutch outer 35 and the clutch inner 49 of the fifth-shift/reverse clutch C5R, the main reverse gear 51, the reverse idle gear 55, the counter reverse gear 54, the counter shaft Sc, the final drive gear 24, the final driven gear 26, and the differential gear box 25.

Figure 5:
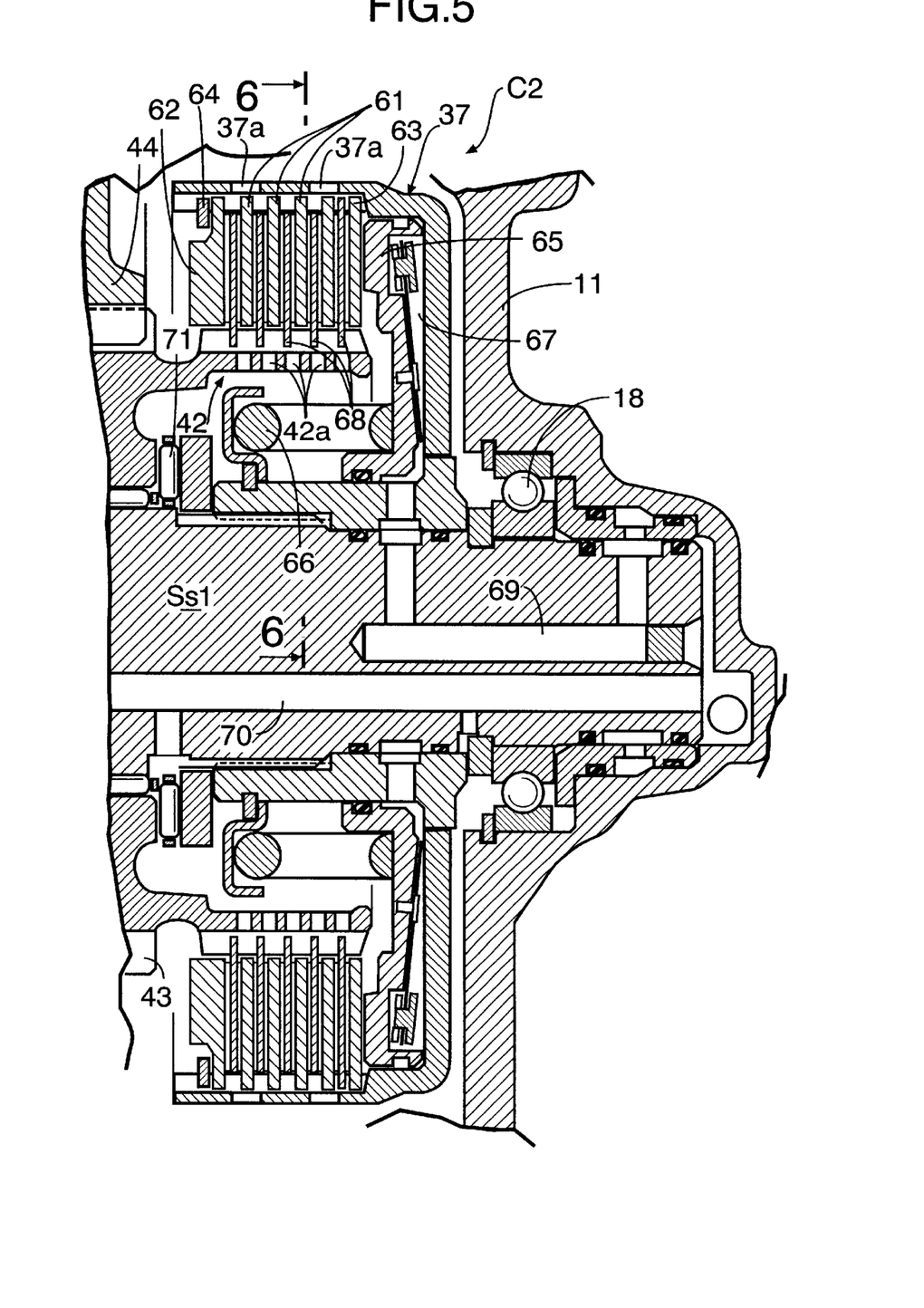
FIG. 5 is an enlarged view of an essential portion shown in FIG. 4.
Figure 6:
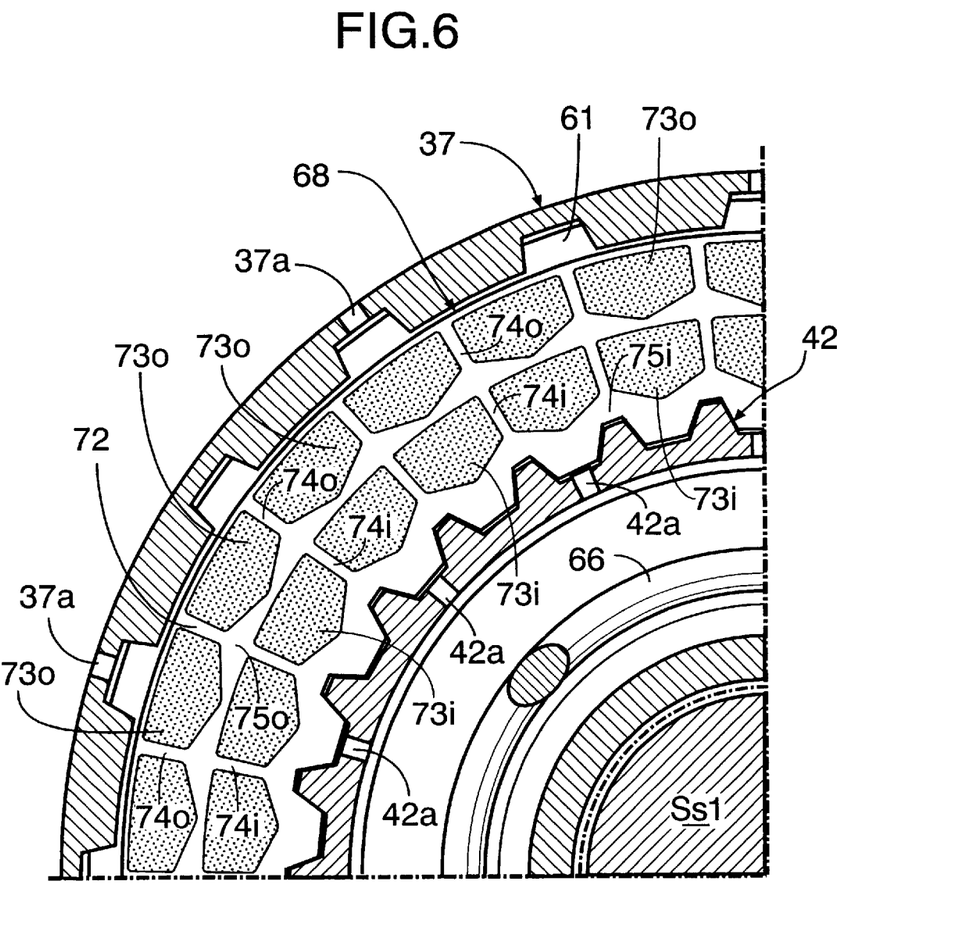
FIG. 6 is a sectional view taken along a line 6—6 in FIG. 5.

As can be seen from FIGS. 5 and 6, the second-shift clutch C2 includes the clutch outer 37 fixed to the first subsidiary shaft Ss1, and the clutch inner 42 formed integrally with the first subsidiary second-shift gear 43. Outer peripheries of a plurality of separator plates 61, a single end plate 62 and a single pressure plate 63 are spline-coupled to an inner periphery of the clutch outer 37. A left side of the end plate 62 located at a left end is locked axially by a clip 64, and a clutch piston 65 is put into abutment against a right side of the pressure plate 63 located at a right end. The clutch piston 65 is slidably received within the clutch outer 37 and urged rightwards by a return spring 66, and a clutch oil chamber 67 is defined between the clutch piston 65 and the clutch outer 37. Inner peripheries of a plurality of friction plates 68 are spline-coupled to an outer periphery of the clutch inner 42. The separator plates 61 and the friction plates 68 are superposed alternately to come into contact with each other.

A working oil passage 69 and a lubricating oil passage 70 are defined within the first subsidiary shaft Ss1. The working oil passage 69 communicates with a clutch oil chamber 67, and the lubricating oil passage 70 communicates with an inner peripheral portion of the clutch inner 42 via the interior of a thrust bearing 71. A large number of oil bores 42a are provided radially through the clutch inner 42 opposed to inner peripheral surfaces of the separator plates 61 and the friction plates 68, and a large number of oil bores 37a are provided radially through the clutch outer 37 opposed to outer peripheral surfaces of the separator plates 61 and the friction plates 68. The oil bores 42a in the clutch inner 42 are formed in thinner portions serving as tooth grooves of a spline with which the friction plates 68 are engaged, and the oil bores 37a in the clutch outer 37 is formed in thicker portions serving as tooth grooves of a spline in which the separator plates 61 are engaged.

Each of the friction plates 68 comprises a plurality of inner friction materials 73i located on a radially inner side and a plurality of outer friction materials 73o located on a radially outer side, which are disposed circumferentially on opposite sides of a base plate 72. A plurality of radial oil passages 74i are each defined between the adjacent inner friction materials 73i to extend radially, and a plurality of radial oil passages 74o are each defined between the adjacent outer friction materials 73o to extend radially. Each of the inner radial oil passages 74i and the outer radial oil passages 74o is aligned in line without being offset circumferentially from each other, and an annular circumferential oil passage 75i is defined inwardly from the inner friction materials 73i.

Each of the outer friction materials 73o formed into a tetragonal shaft includes a pair of side edges 77L and 77R extending radially, and a pair of inner peripheral edges 78L and 78R extending in a V-shape toward radially inner ends of the pair of side edges 77L and 77R. Therefore, the outer circumferential oil passage 75o has an outer peripheral edge formed as a zigzag line. The inner friction materials 73i have a shape similar to that of the outer friction materials 73o, but have a circumferential length less than that of the outer friction materials 73o corresponding to the radially inner position thereof. Naturally, the inner circumferential oil passage 75i also has an outer peripheral edge formed as a zigzag line.

Figure 7:
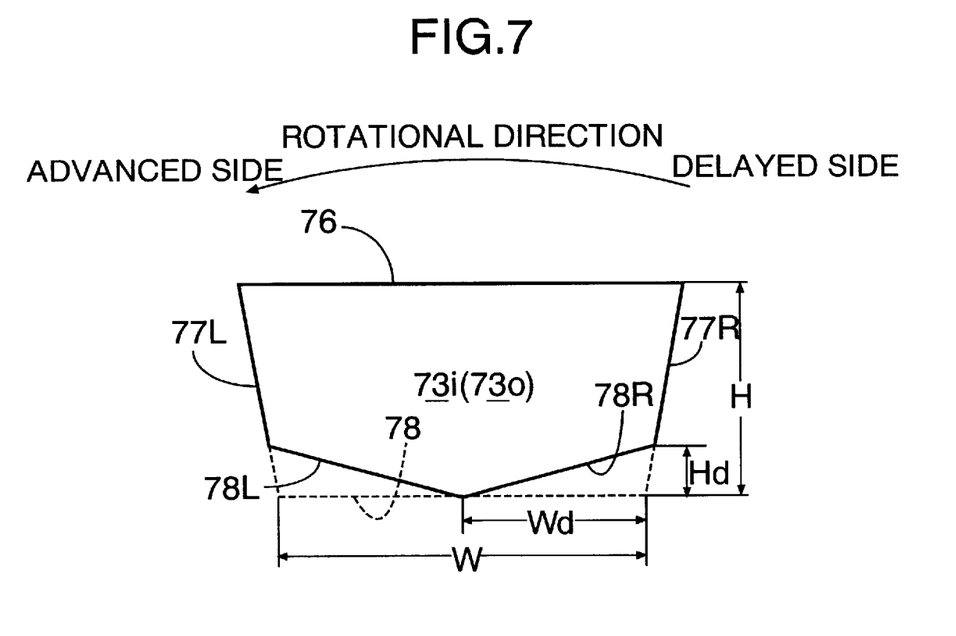
FIG. 7 is an enlarged view of a friction material.

In FIG. 7, the dimensional relationship of between a width W of the inner peripheral edges 78L and 78R and a width Wd of the inner peripheral edge 78R of the inner friction material 73i (or the outer friction material 73o) on a delayed side in a rotational direction (on the right side in FIG. 7) is preferably $\frac{1}{4} \leq Wd/W \leq 1$. Also, the dimensional relationship between a height H of the inner friction material 73i (or the outer friction material 73o) and a height Hd of the inner peripheral edges 78L and 78R is preferably $0 < Hd/H \leq \frac{1}{3}$. Practically, an appropriate value of each of Wd/W and Hd/H is determined in accordance with a clutch capacity and a variation in engagement surface pressure.

Thus, when a working oil is supplied through the working oil passage 69 in the first subsidiary shaft Ss1 into the clutch oil chamber 67 in the second-shift clutch C2, the clutch piston 65 is moved leftwards to clamp the separator plates 61 and the friction plates 68 between the pressure plate 63 and the end plate 62, whereby a torque is transmitted by a frictional force generated at contact portions of the friction materials 73i and 73o of the friction plates 68 and the separator plates 61. In this process, a lubricating oil supplied through the lubricating oil passage 70 in the first subsidiary shaft Ss1 is permitted to flow radially outwards by a centrifugal force to pass through the oil bores 42a in the clutch inner 42 to lubricate the contact portions of the friction materials 73i and 73o and the separator plates 61, thereby preventing the occurrence of seizing. The lubricating oil, which has lubricated the contact portions, is discharged radially outwards through the oil bores 37a in the clutch outer 37. When the hydraulic pressure applied to the clutch oil chamber 67 is released, the clutch piston 65 is moved rightwards by the repulsing force of the return spring 66, whereby the surface pressure on the contact portions between the friction materials 73i/73o and the separator plates 61 is released, to thereby release the engagement of the second-shift clutch C2.

When the fourth-shift clutch C4 is in the engaged state to establish the fourth gear shift stage, or the fifth-shift clutch C5 is in the engaged state to establish the fifth gear shift stage, the clutch outer 37 and the clutch inner 42 of the second-shift clutch C2 in the non-engaged state are rotated relative to each other, and the separator plates 61 and the friction plates 68 are rotated relative to one another. In this process, the lubricating oil is guided effectively to the inner radial oil passages 74i and the outer radial oil passages 74o, and the amount of the lubricating oil flowing onto surfaces of the friction materials 73i and 73o is reduced, because the inner peripheral edges 78L and 78R of the friction materials 73i and 73o are inclined in a V-shape toward the inner ends of the radial oil passages 74i and 74o defined between the friction materials 73i and 73o on the surfaces of the friction plates 68.

Figure 8:
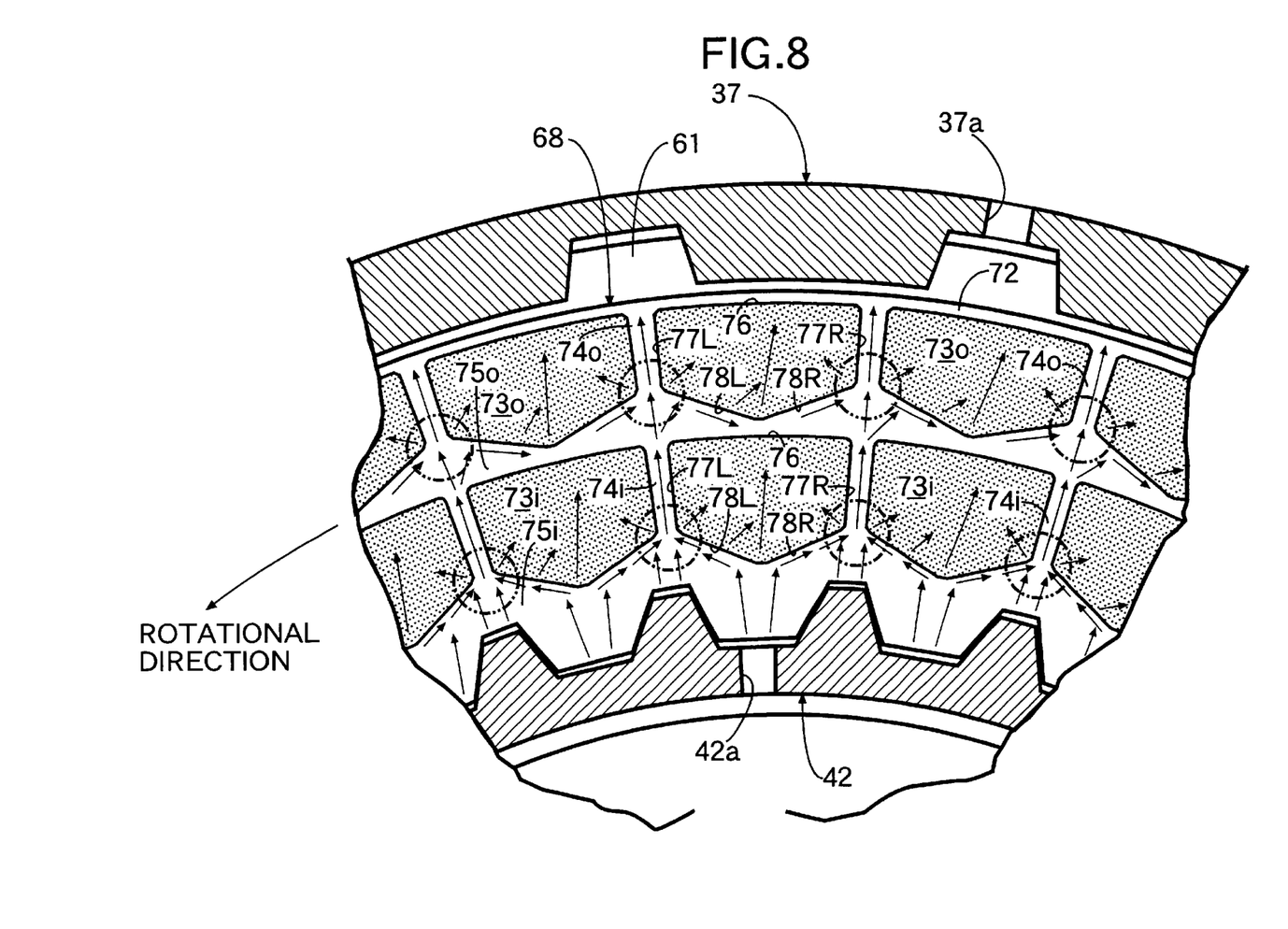
FIG. 8 is a view showing the flow of a lubricating oil along the friction plate.

More specifically, the lubricating oil remaining between the friction plates 68 and the separator plates 61 is urged radially outwards in FIG. 8 by the centrifugal force and guided on the inner peripheral edges 78L and 78R of the inner friction materials 73i into the inner radial oil passages 74i. Therefore, the amount of the lubricating oil flowing onto the surfaces of the inner friction materials 73i is reduced. When the friction plates 68 is rotated counterclockwise, the lubricating oil intends to flow toward the delayed side (rightwards in FIG. 8) relative to the friction plates 68 by the Coriolis force. Therefore, the amounts of the lubricating oil flowing along the pair of inner peripheral edges 78L and 78R of each of the inner friction materials 73i are not equal to each other, and the amount of lubricating oil flowing along the right inner peripheral edge 78R, as viewed in FIG. 8, is greater than that of the lubricating oil flowing along the left inner peripheral edge 78L, as viewed in FIG. 8.

Much of the lubricating oil flowing out of the inner radial oil passages 74i flows into the outer radial oil passages 74o leading in series to the inner radial oil passages 74i, but the lubricating oil flowing out of the inner radial oil passages 74i intends to flow toward the delayed side in the rotational direction by the Coriolis force and, hence, a portion of such lubricating oil flows onto the surfaces of the outer friction materials 73o. However, much of the lubricating oil is guided on the inner peripheral edges 78L and 78R of the outer friction materials 73o toward the delayed side in the rotational direction and, thus, flows smoothly from the right inner peripheral edge 78R, as viewed in FIG. 8, into the outer radial oil passages 74o.

In the above manner, the amount of the lubricating oil remaining between the friction materials 73i and 73o of the friction plates 68 and the separator plates 61 in the non-engaged state of the second-shift clutch C2 can be suppressed to a minimum, and an increase in friction resistance as a result of drag produced by the lubricating oil can be prevented. Moreover, the pressure load of the lubricating oil flowing into the radial oil passages 74i and 74o pushes the friction plates 68 and the separator plates 61 open in such a manner that they are moved uniformly away from each other, as shown as being surrounded by a circle in FIG. 8, and hence, it is possible to further reduce friction resistance as a result of the drag produced by the lubricating oil. Particularly, a pressure load is generated in both the inner radial oil passages 74i and the outer radial oil passages 74o and hence, the friction plates 68 and the separator plates 61 can be moved further effectively away from each other.

The reason why the hydraulic pressure load generated in the radial oil passages 74i and 74o by the inner peripheral edges 78L and 78R inclined in a V-shape is increased, is described as follows: Such load P is represented by $P=\rho Qv$, where $\rho$ represents a density of the lubricating oil; Q represents a flow rate of the lubricating oil; and v represents a flow speed of the lubricating oil. The smaller the dissipation factor, the larger the flow rate of the lubricating oil is. The dissipation factor becomes smaller when the inner ends of the radial oil passages 74i and 74o are smoothly wider toward the radially inner side.

Figure 13:
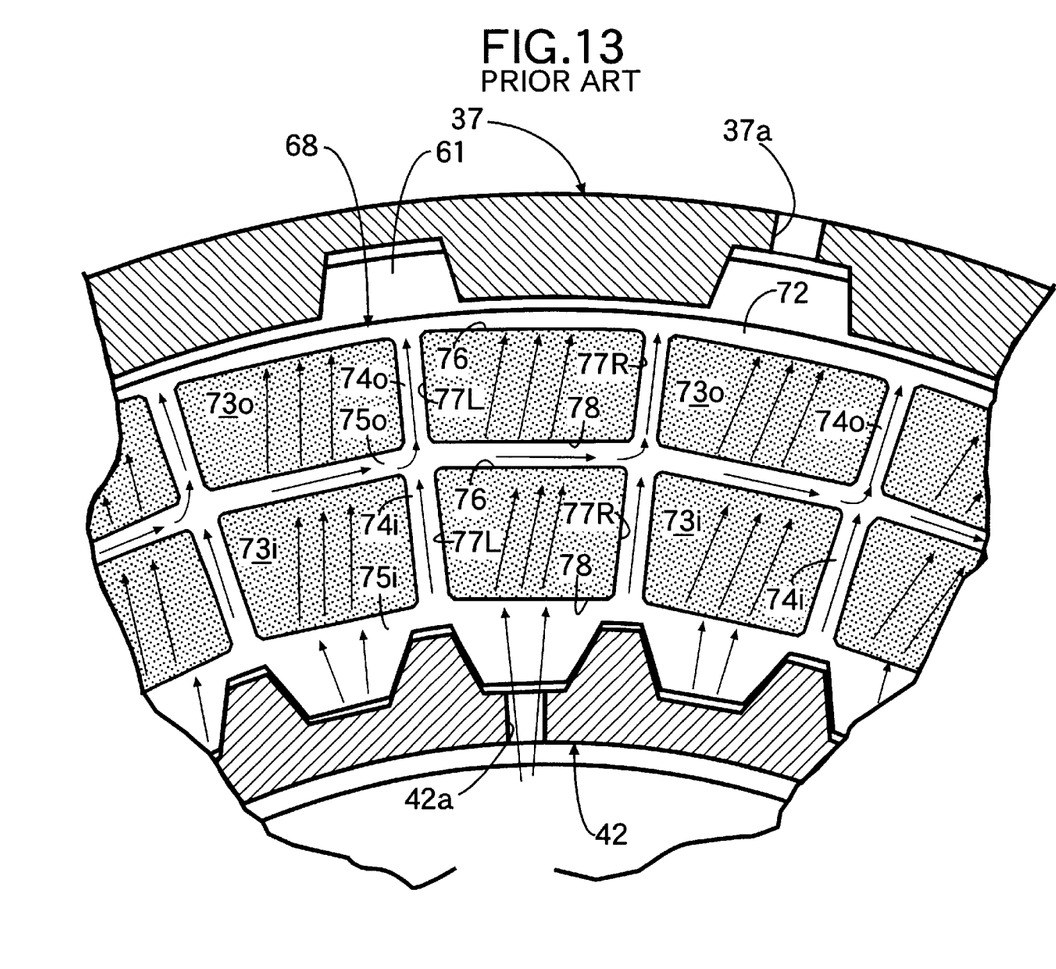
FIG. 13 is a view similar to FIG. 8, but according to the prior art.

In contrast, in a conventional friction plate 68 shown in FIG. 13, inner peripheral edges 78 of trapezoidal friction materials 73i and 73o extend circumferentially and hence, do not exhibit a function of smoothly guiding the lubricating oil to the radial oil passages 74i and 74o. As a result, the amount of lubricating oil flowing onto the surfaces of the friction materials 73i and 73o is increased, thereby providing not only an increase in friction resistance, but also a decrease in effect of moving the friction plates 68 and the separating plates 61 uniformly away from each other by the lubricating oil flowing into the radial oil passages 74i and 74o.

Figure 9:
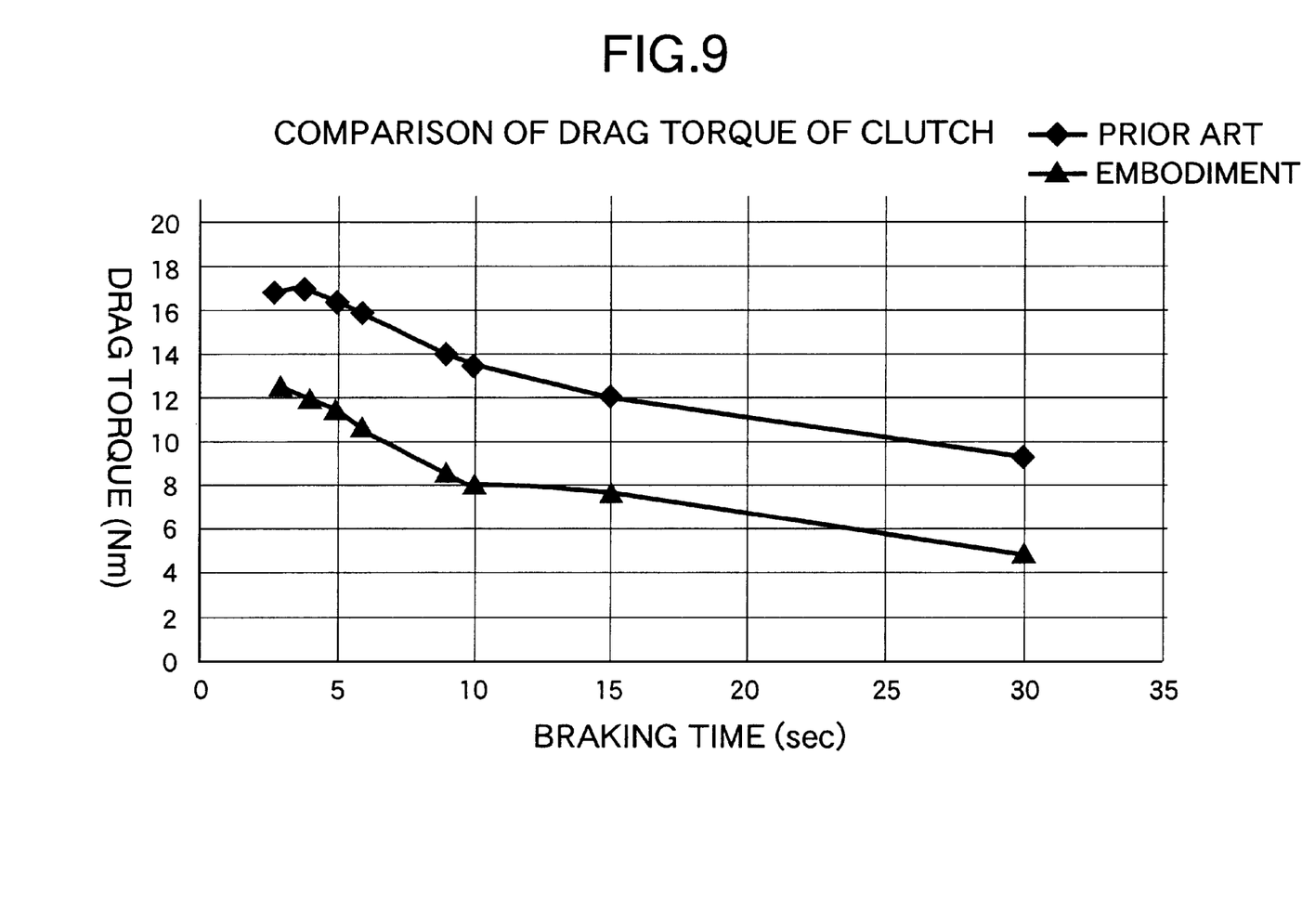
FIG. 9 is a graph showing an effect of reducing a drag torque of the friction plate.

FIG. 9 shows changes in drag torque after the release of the engagement of the second-shift clutch C2 for the conventional friction plate 68 (having the trapezoidal friction materials) shown in FIG. 13 and the friction plate 68 according to the present embodiment. It is confirmed from this graph that the drag torque is reduced significantly in the present embodiment.

To sufficiently exhibit the above-described effect in each of the clutches, it is desirable that, of friction engage elements of the clutch brought into engagement with one another, those rotated at a high speed are the "friction pates 68", and those rotated at a low speed are the "separator plates 61". This is because when the friction plates 68 are rotated at the high speed, a large drag torque is generated, but the effect of reducing the drag torque can be exhibited effectively by applying the present invention to the friction plates 68.

TABLE 1

| Gear Shift | Clutch | | | | |
|---|---|---|---|---|---|
| Stage | C1 | C2 | C3 | C4 | C5R |
| Low | — | P | D | P | P |
| Second | D | — | D | P | P |
| Third | D | D | — | P | P |

TABLE 1-continued

| Gear Shift Stage | Clutch | | | | |
|---|---|---|---|---|---|
| | C1 | C2 | C3 | C4 | C5R |
| Fourth | D | D | P | — | P |
| Fifth | D | D | P | D | — |

Table 1 shows which of the clutch disks (inner side) and the clutch plates (outer side) of each of the first-shift clutch C1, the second-shift clutch C2, the third-shift clutch C3, the fourth-shift clutch C4 and the fifth-shift/reverse clutch C5R are rotated at a high speed in each of the first to fifth gear shift stages. In Table 1, "D" indicates a case where the clutch disks are rotated at the high speed, and "P" indicates a case where the clutch plates are rotated at the high speed.

In the first-shift clutch C1, the clutch disks are rotated at the high speed in all the second to fifth gear shift stages and, hence, the clutch disks rotated at the high speed in all the gear shift stages are the friction plates 68, and the clutch plates not rotated at the high speed in any of the gear shift stages are the separator plates 61.

In the second-shift clutch C2, the clutch plates are rotated at the high speed in the first gear shift stage, and the clutch disks are rotated at the high speed in the third to fifth gear shift stages. Therefore, the clutch disks rotated at the high speed in the three gear shift stages are the friction plates 68, and the clutch plates rotated at the high speed in the one gear shift stage are the separator plates 61.

In the third-shift clutch C3, the clutch disks are rotated at the high speed in the first and second gear shift stages, and the clutch plates are rotated at the high speed in the fourth and fifth gear shift stages, but a difference in rotation between the clutch plates and the clutch disks in the fourth and fifth gear shift stages is larger than that in the first and second gear shift stages and hence, the clutch plates rotated at the high speed in the fourth and fifth gear shift stages are the friction plates 68, and the clutch disks rotated at the high speed in the first and second gear shift stages are the separator plates 61.

In the fourth-shift clutch C4, the clutch plates are rotated at the high speed in the first to third gear shift stages, and the clutch disks are rotated at the high speed in the fifth gear shift stage. Therefore, the clutch plates rotated at the high speed in the three gear shift stages are the friction plates 68, and the clutch disks rotated at the high speed in the one gear shift stage are the separator plates 61.

In the fifth-shift/reverse clutch C5R, the clutch plates are rotated at the high speed in all the first to fourth gear shift stages and hence, the clutch plates rotated at the high speed in all the gear shift stages are friction plates 68, and the clutch disks not rotated at the high speed in any of the gear shift stages are the separator plates 61.

Examples in which the friction plates 68 having the friction materials 73i and 73o are divided into the clutch disks and the clutch plates, have been described based on Table 1. However, even in the case where the friction materials 73i and 73 are mounted equally on opposite sides of clutch disks without consideration of the rotating speeds of the clutch disks and the clutch plates, the effect can be exhibited, as compared with the prior art example.

Figure 10:
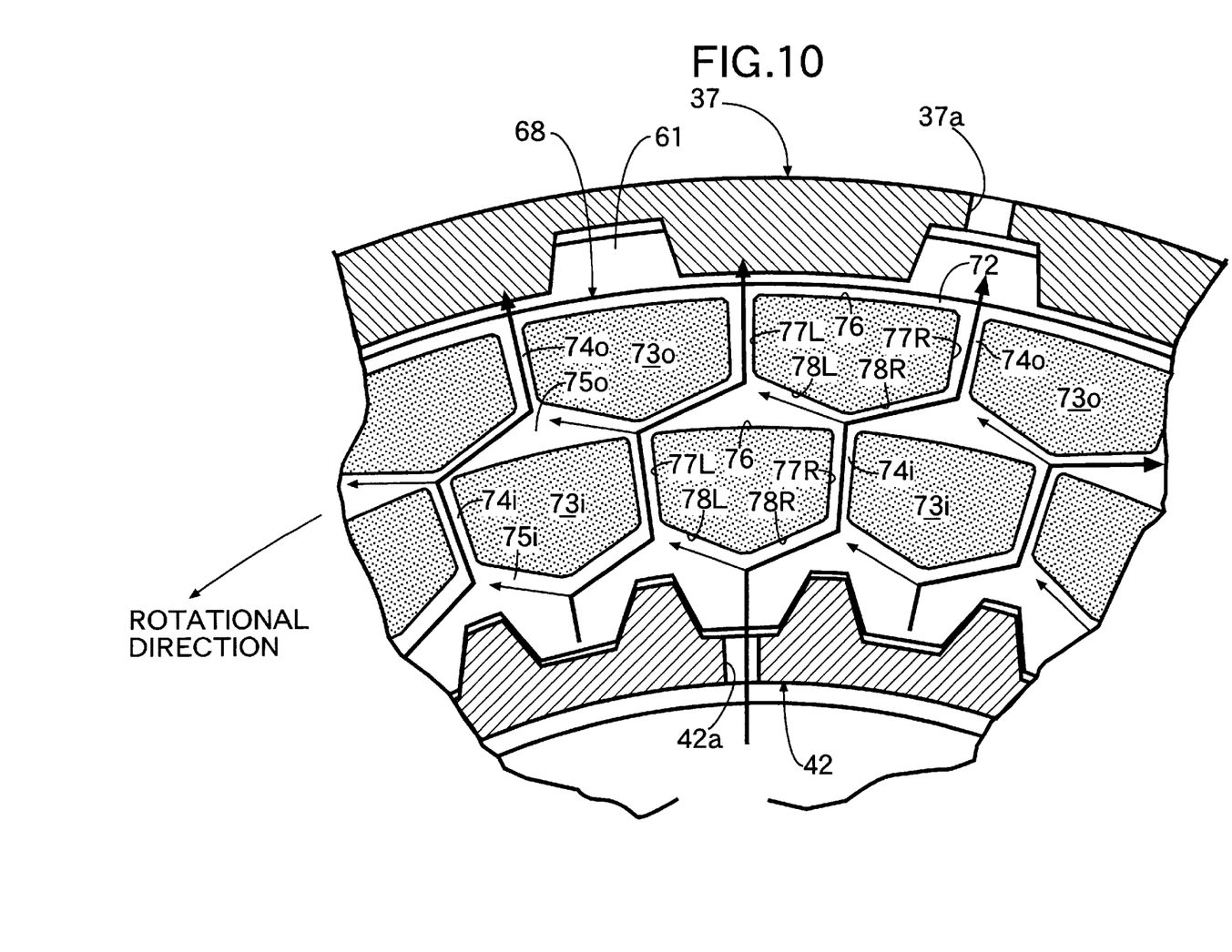
FIG. 10 is a view similar to FIG. 8, but according to a second embodiment of the present invention.

A second embodiment of the present invention will now be described with reference to FIG. 10.

The second embodiment is an improvement in the first embodiment. Although the first embodiment employs the inner friction materials 73i and the outer friction materials 73o each arranged in line in the circumferential direction, the second embodiment employs the inner friction materials 73i and outer friction materials 73o which are offset from each other by a half pitch in the circumferential direction. Therefore, outer ends of inner radial oil passages 74i are opposed to apexes of the inner peripheral edges 78L and 78R of the outer friction materials 73o.

With the second embodiment, a lubricating oil flowing out of the outer ends of the inner radial oil passages 74i into a circumferential oil passage 75o is guided on the inner peripheral edges 78L and 78R of the outer friction materials 73o and diverted to circumferentially opposite sides to flow further smoothly into outer radial oil passages 74o. The function and effect of the first embodiment can be made more significant by further increasing the hydraulic pressure load generated at inner ends of the outer radial oil passages 74o. In this process, lubricating oil is liable to flow toward the delayed side in a rotational direction (rightwards in FIG. 10) relative to the friction plates 68 and hence, the amounts of lubricating oil flowing along the pair of inner peripheral edges 78L and 78R of the outer friction materials 73o are such that the amount of lubricating oil flowing along the right inner peripheral edge 78R as viewed in FIG. 10 is overwhelmingly larger than that of lubricating oil flowing along the left inner peripheral edge 78L as viewed in FIG. 10.

In the first embodiment shown in FIG. 8, there is a possibility that the lubricating oil flowing out of the inner radial oil passages 74i is turned rightwards by the Coriolis force and flows in a direction intersecting the inner peripheral edges 78L of the outer friction materials 73o on an advanced side in the rotational direction, and is not guided smoothly to the outer radial oil passages. In the second embodiment, however, the lubricating oil flowing out of the inner radial oil passages 74i is prevented from flowing in the direction intersecting the inner peripheral edges 78L of the outer friction materials 73o on an advanced side in the rotational direction, because the inner and outer radial oil passages 74i and 74o are offset by the half pitch in the circumferential direction, so that most of the lubricating oil is guided along the inner peripheral edges on the delayed side in the rotational direction and permitted to flow smoothly into the outer radial oil passages 74o located on the delayed side in the rotational direction.

In the second embodiment, in either of the clockwise and counterclockwise directions the friction plates 68 rotates, a similar effect can be achieved, because the inner friction materials 73i and the outer friction materials 73o are offset by the half pitch from each other and disposed symmetrically in rotation.

A third embodiment of the present invention will now be described with reference to FIG. 11.

The third embodiment is different from the second embodiment in respect of the shapes of the inner friction materials 73i and the outer friction materials 73o. In particular, in each of the inner friction materials 73i and the outer friction materials 73o in the third embodiment, an outer peripheral edge 76 extends circumferentially, and a pair of side edges 77L and 77R extend radially, but an inner peripheral edge 78 is inclined with respect to the circumferential direction. More specifically, the inner peripheral edge 78 is inclined so that an advanced side (a left side in FIG. 11) thereof in the rotational direction is located on a radially inner side and a delayed side (a right side in FIG. 11) thereof in the rotational direction is located on a radially outer side. Namely, the inner friction materials 73*i* and the outer friction materials 73*o* in the third embodiment correspond to a case where the value of Wd/W in FIG. 7 is set at 1. An outer end of each of the inner radial oil passages 74*i* is disposed slightly offset to the delayed side in the rotational direction (rightwards in FIG. 11) with respect to an inner end of each of the outer radial oil passages 74*o*.

As described above, the lubricating oil tends to flow radially outwards by the centrifugal force and at the same time, flow to the delayed side in the rotational direction by the Coriolis force. However, because the inner peripheral edges 78 of the inner friction materials 73*i* and the outer friction materials 73*o* are disposed so that they are inclined in the direction of flowing of the lubricating oil, the lubricating oil flowing along the inner peripheral edges 78 can be guided smoothly to the radial oil passages 74*i* and 74*o*.

Thus, the amount of the lubricating oil flowing onto the surfaces of the inner friction materials 73*i* and the outer friction materials 73*o* can be reduced to prevent an increase in friction resistance due to the dragging of the lubricating oil, and the friction plates 68 and the separator plates 61 can be pushed open by the pressure load of the lubricating oil flowing into the radial oil passages 74*i* and 74*o*, so that they are moved uniformly away from each other, thereby further reducing the friction resistance due to the dragging of the lubricating oil. Especially, because the outer ends of the inner radial oil passages 74*i* are offset slightly to the delayed side in the rotational direction with respect to the inner ends of the outer radial oil passages 74*o*, the lubricating oil flowing out of the inner radial oil passages 74*i* can be guided smoothly to the inner peripheral edges 78 of the outer friction materials 73*o*.

Figure 11:
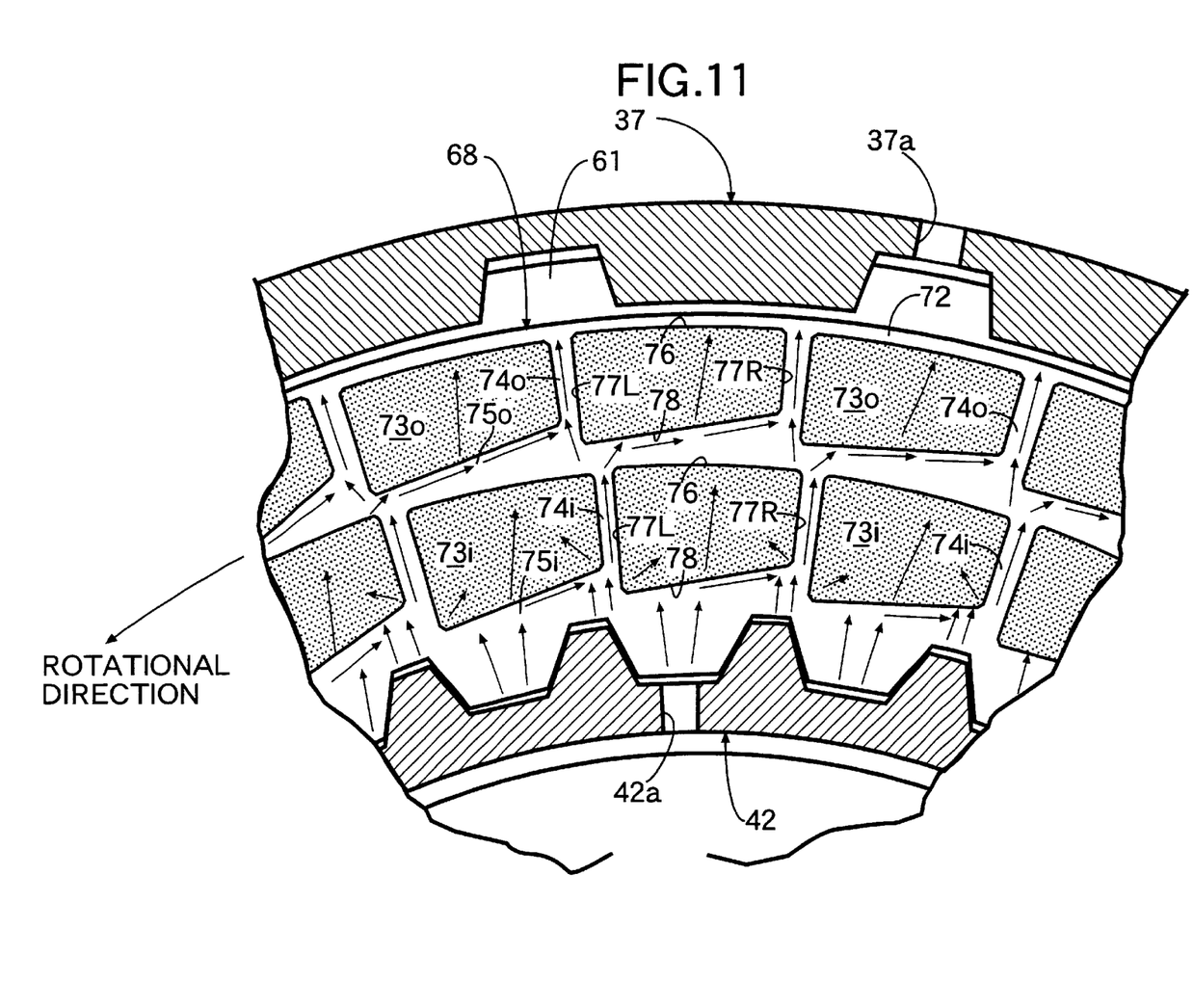
FIG. 11 is a view similar to FIG. 8, but according to a third embodiment of the present invention.

As described above, in the third embodiment, when the direction of rotation of the friction plates 68 is the counter-clockwise direction in FIG. 11, a maximum effect can be achieved.

In the friction plates 68 in each of the first and second embodiments, the inner friction materials 73*i* and the outer friction materials 73*o* are disposed symmetrically in the circumferential direction, and hence, it is unnecessary to discriminate the surface and back thereof from each other during assembling of them. In the friction plates 68 in the third embodiment, however, the inner friction materials 73*i* and the outer friction materials 73*o* are disposed asymmetrically in the circumferential direction, and hence, it is necessary to discriminate the surface and back thereof from each other depending on the rotational direction during assembling of them.

Although the embodiments of the present invention have been described in detail, it will be understood that various modifications may be made without departing from the subject matter of the present invention.

For example, the friction plates 68 according to the present invention have been applied to the wet hydraulic clutch in each of the embodiments, but may be applied to a wet hydraulic brake.

The friction materials 73*i* and 73*o* have been disposed at the two inner and outer stages in each of the embodiments, but may be disposed at three or more inner and outer stages.

The inner friction materials 73*i* and the outer friction materials 73*o* in each of the embodiments are separated from one another by the radial oil passages 74*i* and 74*o* and the circumferential oil passage 75*o*, but the oil passages 74*i*, 74*o* and 75*o* may be formed by pressing an annular friction material to depress portions of the annular friction material into grooves.

Figure 12A:
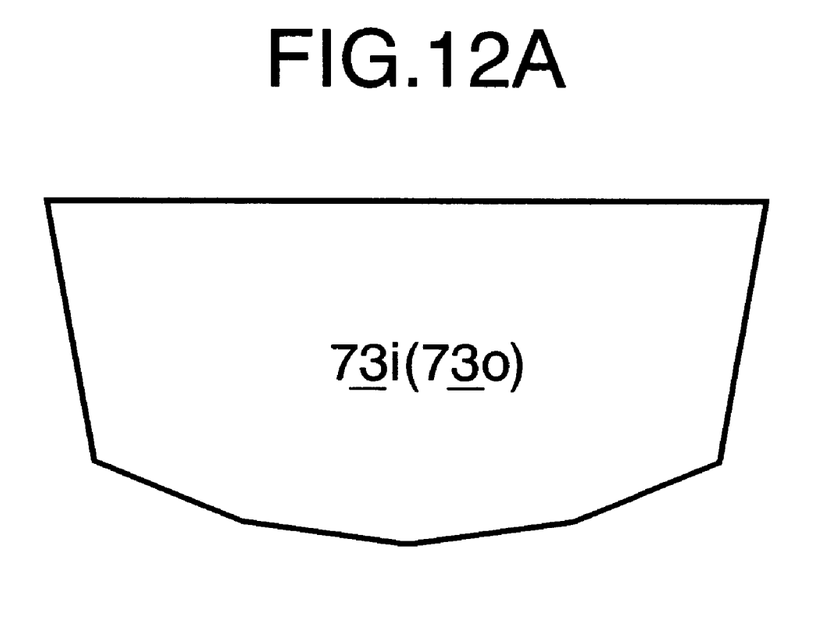
FIG. 12A is a diagram showing another shape of a friction material.
Figure 12B:
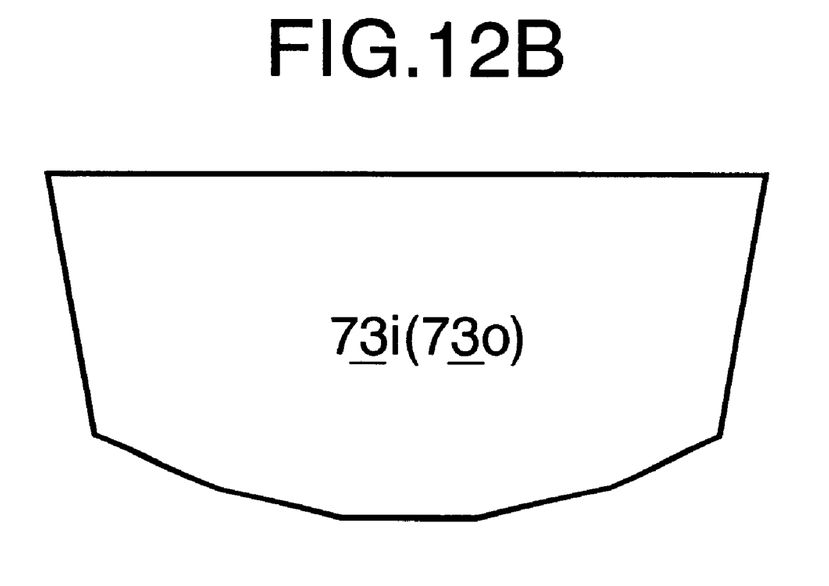
FIG. 12B is a diagram showing yet another shape of the friction material.

The inner peripheral edges 78L and 78R of the friction materials 73*i* and 73*o* in each of the first and second embodiments are formed into a V-shape, but may instead be formed into a U-shape. In this case, the inner peripheral edges of the friction materials 73*i* and 73*o* need not form a curved line, and may form a folded line, as shown in FIG. 12.

The friction materials 73*i* and 73*o* have been mounted on the opposite surfaces of the clutch disks or the clutch plates in each of the embodiments, but may be mounted on one-surfaces of the clutch disks and the clutch plates.

What is claimed is:

1. A wet friction plate comprising a plurality of friction materials disposed circumferentially on a surface of an annular first plate with a plurality of radial oil passages each provided between adjacent ones of the friction materials and extending radially, said friction materials being in contact with a surface of an annular second plate to transmit torque, wherein said plurality of friction materials are disposed at a plurality of radially inner and outer stages with circumferential oil passages provided between said stages and extending circumferentially along inner peripheral edges of said friction materials and at least a portion of each of the inner peripheral edges of said friction materials is inclined radially outwards toward a radially inner end of each of the radial oil passages facing a delayed side of each of said friction materials in a rotational direction.

2. The wet friction plate according to claim 1, wherein the radial oil passages defined between the friction materials at the radially inner stage are offset to the delayed side in the rotational direction with respect to the radial oil passages defined between the friction materials at the radially outer stage.

3. The wet friction plate according to claim 2, wherein the inner peripheral edges of each of said friction materials are inclined radially outwards to form a V-shape or U-shape projecting toward radially inner ends of a pair of the radial oil passages facing circumferentially opposite sides of each of said friction material.

4. A wet friction plate comprising a plurality of friction materials disposed circumferentially on a surface of an annular first plate with a plurality of radial oil passages each provided between adjacent ones of the friction materials and extending radially, said friction materials being in contact with a surface of an annular second plate to transmit torque, wherein said plurality of friction materials are disposed at a plurality of radially inner and outer stages with circumferential oil passages provided between said stages and extending circumferentially along inner peripheral edges of said friction materials, and wherein the inner peripheral edges of each of said friction materials are inclined radially outwards to form a V-shape or U-shape projecting toward radially inner ends of a pair of the radial oil passages facing circumferentially opposite sides of each of said friction material.

* * * * *